(12) United States Patent
Chen

(10) Patent No.: US 7,401,717 B2
(45) Date of Patent: Jul. 22, 2008

(54) AUTOMATIC LIFTING MECHANISM FOR MOTORCYCLE SADDLE

(75) Inventor: Ke-Chien Chen, Taipei (TW)

(73) Assignee: Startech Co., Ltd., Taipei (TW)

( * ) Notice: Subject to any disclaimer, the term of this patent is extended or adjusted under 35 U.S.C. 154(b) by 381 days.

(21) Appl. No.: 11/324,338

(22) Filed: Jan. 4, 2006

(65) Prior Publication Data

US 2006/0219456 A1 Oct. 5, 2006

(30) Foreign Application Priority Data

Mar. 29, 2005 (TW) ................ 94204846 U

(51) Int. Cl.
*B62J 7/04* (2006.01)
*B62D 61/02* (2006.01)
(52) U.S. Cl. ............. 224/413; 224/428; 224/435; 248/213.1; 248/222.51; 248/222.52; 248/284.1; 248/581; 248/590; 180/219; 411/351
(58) Field of Classification Search .......... 224/413, 224/428, 435; 248/213.1, 581, 222.51, 222.52, 248/284.1, 590; 180/219; 411/351
See application file for complete search history.

(56) References Cited

U.S. PATENT DOCUMENTS

| | | | |
|---|---|---|---|
| 6,338,260 B1 * | 1/2002 | Cousins et al. ............... 70/2 |
| 6,428,076 B2 * | 8/2002 | Sumada et al. ............. 296/37.1 |
| 6,513,689 B2 * | 2/2003 | Vincenzo ................... 224/435 |
| 6,793,110 B2 * | 9/2004 | Hamilton ................... 224/413 |
| 6,796,540 B1 * | 9/2004 | Manceor ................... 248/284.1 |
| 6,832,710 B2 * | 12/2004 | Galbraith et al. ........... 224/413 |
| 2006/0290179 A1 * | 12/2006 | Reinhard ................ 297/215.11 |

* cited by examiner

*Primary Examiner*—Lesley D. Morris
*Assistant Examiner*—Marlon Arce-Diaz
(74) *Attorney, Agent, or Firm*—Muncy, Geissler, Olds & Lowe, PLLC

(57) ABSTRACT

An automatic lifting mechanism for motorcycle saddle mainly includes a first and a second supporting arm respectively fixed to a saddle and a body of a motorcycle, at least one spiral spring having two sideward extended terminal ends separately pressed against the two supporting arms, and a damping device located in the at least one spiral spring to rotatably engage at two ends with the two supporting arms. While a spring force of each spiral spring quickly elastically stretches open the first and the second supporting arm when the saddle is unlocked, the damping device limits a rotating speed of the two supporting arms, so that the saddle could be automatically lifted or moved downward at a buffered speed without the risk of injuring a user.

24 Claims, 8 Drawing Sheets

AUTOMATIC LIFTING MECHANISM FOR MOTORCYCLE SADDLE

FIELD OF THE INVENTION

The present invention relates to an automatic lifting mechanism for motorcycle saddle, and more particularly to a lifting mechanism that automatically springs open an unlocked motorcycle saddle to a suitable angular position at a buffered speed, so that a user could conveniently access articles positioned in a space below the saddle.

BACKGROUND OF THE INVENTION

A motorcycle does not require a big parking area and could move at a speed satisfying general users, and is therefore widely accepted by people living in crowded cities. The currently available motorcycles usually include a storage space below a saddle for holding miscellaneous things, such as a helmet and other personal articles. The saddle is pivotally connected at an end to one side of a top opening of the storage space, and at an opposite end to a hook controlled through a key, so that the saddle could be pivotally turned to a closed position and locked.

However, when the saddle is unlocked, a user has to lift the saddle with one hand to expose the storage space for removing things therefrom or positioning things thereinto. This is, of course, very inconvenient to the user. In the event the motorcycle is improperly parked and tends to incline or vibrate, the saddle is subject to unexpected closing from the lifted position to even injure the user or damage things positioned below the saddle.

It is therefore tried by the inventor to develop an automatic lifting mechanism for motorcycle saddle to overcome the above-mentioned problems with the conventional saddle.

SUMMARY OF THE INVENTION

A primary object of the present invention is to provide an automatic lifting mechanism for motorcycle saddle, so that a saddle of a motorcycle could be automatically elastically lifted or moved downward at a buffered speed without the risk of injuring a user.

To achieve the above object, the automatic lifting mechanism for motorcycle saddle according to the present invention mainly includes a first and a second supporting arm respectively fixed to a saddle and a body of a motorcycle, at least one spiral spring having two sideward extended terminal ends separately pressed against the two supporting arms, and a damping device located in each spiral spring to rotatably engage at two ends with the two supporting arms. While a spring force of each spiral spring quickly elastically stretches open the first and the second supporting arm when the saddle is unlocked, the damping device limits a rotating speed of the two supporting arms, so that the saddle could be automatically lifted or moved downward at a buffered speed.

Another object of the present invention is to provide an automatic lifting mechanism for motorcycle saddle that has effectively reduced volume and is easy to assemble.

To achieve the above object, the automatic lifting mechanism for motorcycle saddle of the present invention includes a cylindrical damping device being mounted in a spiral spring with two ends separately directly connected to two supporting arms of the automatic lifting mechanism.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
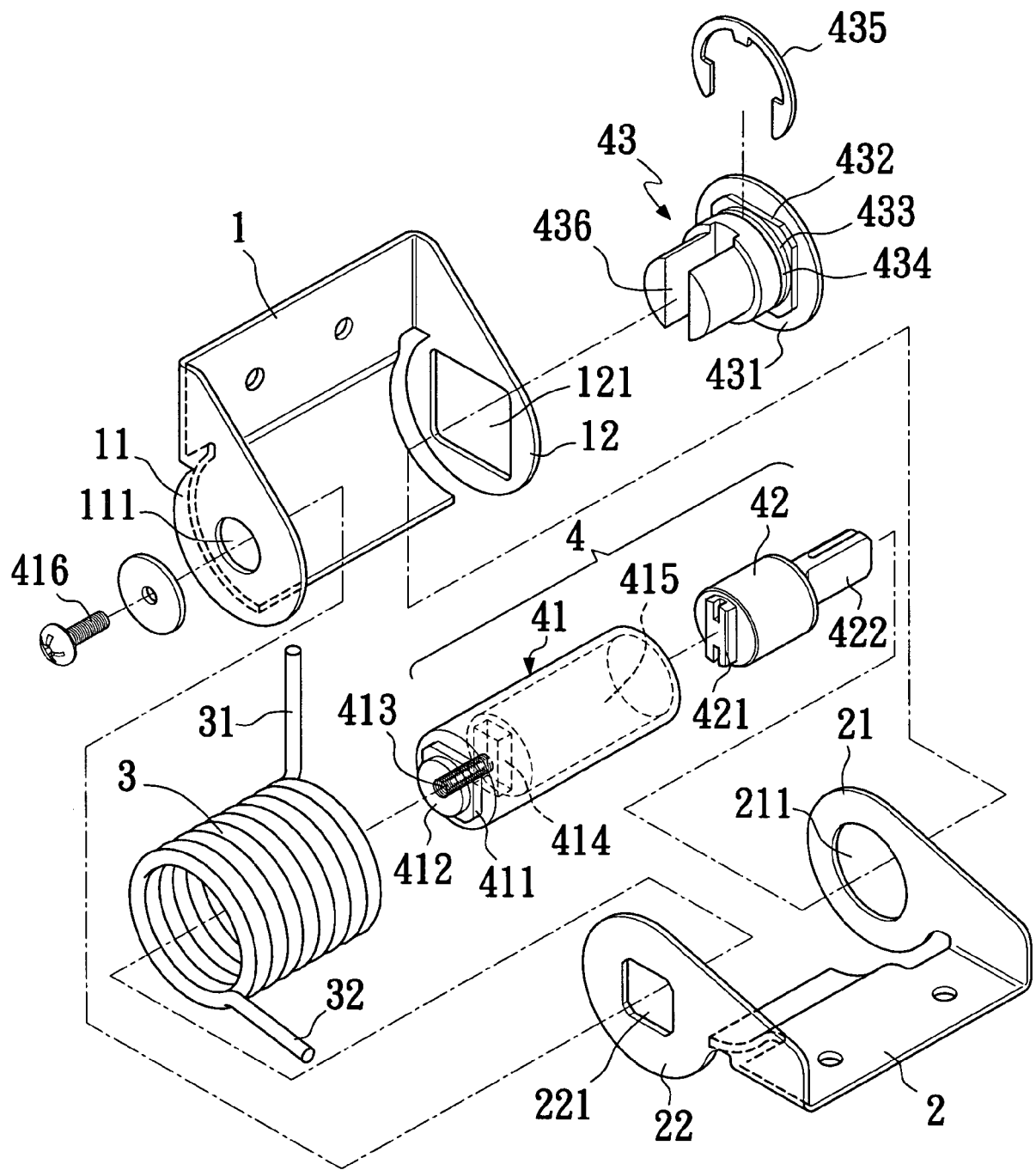
FIG. 1 is an exploded perspective view of an automatic lifting mechanism for motorcycle saddle according to a first embodiment of the present invention.
Figure 2:
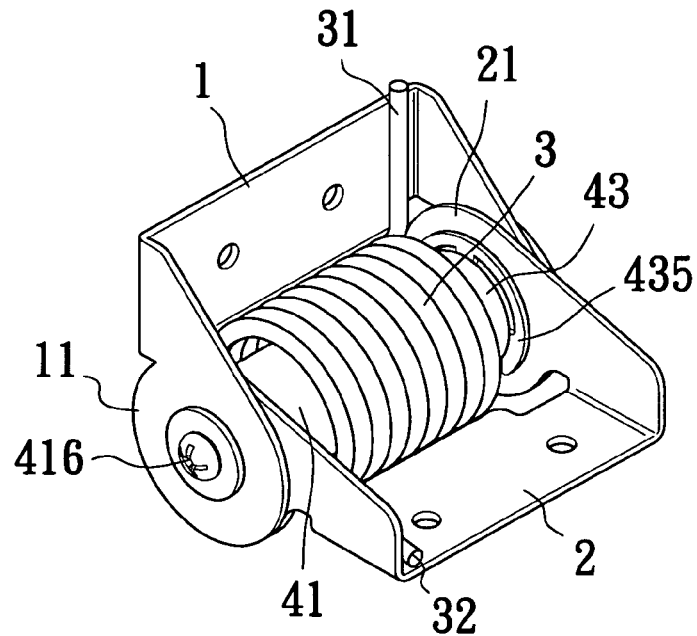
FIG. 2 is an assembled perspective view of FIG. 1.
Figure 3:
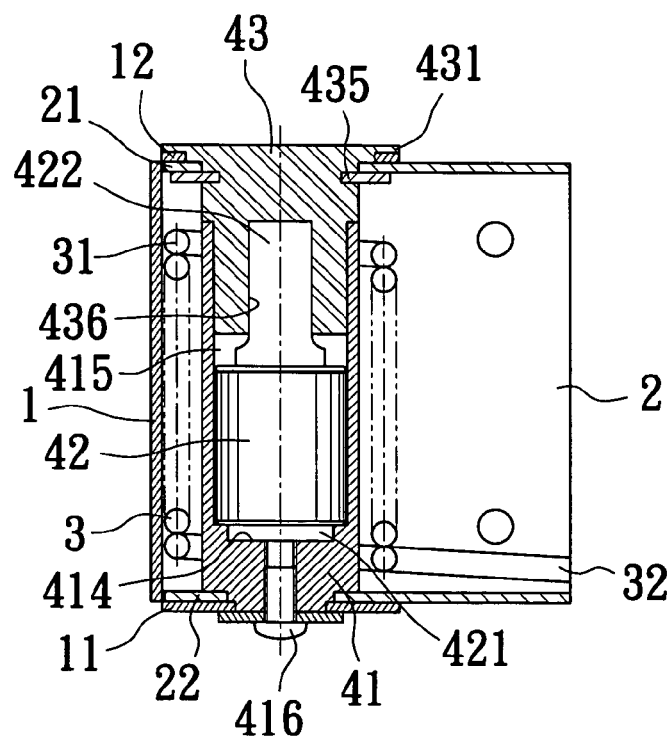
FIG. 3 is an assembled sectional view of FIG. 2.

Please refer to FIGS. 1 and 2 that are exploded and assembled perspective views, respectively, of an automatic lifting mechanism for motorcycle saddle according to a first embodiment of the present invention, and to FIG. 3 that is an assembled sectional view of the first embodiment of the present invention. As shown, the first embodiment of the present invention mainly includes a first supporting arm 1, a second supporting arm 2, a spiral spring 3, and a damping device 4.

The first supporting arm 1 is provided at two lateral ends with two perpendicularly bent sidewalls 11, 12. The first sidewall 11 is provided at a central area with a round hole 111, and the second sidewall 12 is provided at a central area with a retaining hole 121 having at least one straight edge, which is a square hole in the illustrated embodiment.

The second supporting arm 2 is also provided at two lateral ends with two perpendicularly bent sidewalls 21, 22. The first sidewall 21 is provided at a central area with a round hole 211, and the second sidewall 22 is provided at a central area with a retaining hole 221 having at least one straight edge, which is a square hole in the illustrated embodiment.

The spiral spring 3 has two terminal ends 31, 32 sideward extended therefrom in two different directions to press against the first and the second supporting arm 1, 2, respectively.

The damping device 4 includes a sleeve 41, a damper 42, and an end plug 43. The sleeve 41 is a cylindrical member, an end of which is formed into a receiving space 415 having an open outer end. A mortise 414 having a predetermined shape is provided at a closed inner end of the receiving space 415. The other end of the sleeve 41 is externally provided at a central area with an axially outward projected locking section 411 having a cross section and size the same as that of the retaining hole 221 on the second supporting arm 2, a round butt 412 axially outward projected from the locking section 411, and a threaded hole 413 extended from a center of the round butt 412 into the receiving space 415.

The damper 42 is in the form of a column and adapted to locate in the receiving space 415. An end of the damper 42 is externally provided with a tenon 421 for engaging with the mortise 414 in the sleeve 41, and the other end of the damper 42 is formed into a flat head 422.

The end plug 43 includes an expanded stopper 431, a locking section 432 axially projected from an inner side of the stopper 431 and having a cross section the same as that of the retaining hole 121 on the first supporting arm 1, and a round column 433 axially projected from the locking section 432 and having an annular groove 434 formed near a base thereof. An extended inner portion of the round column 433 is formed into a clamping slot 436 for clamping the flat head 422 of the damper 42 therein.

To assemble the present invention, first position the second supporting arm 2 in the first supporting arm 1, so that the sidewalls 22, 21 of the second supporting arm 2 and the sidewalls 11, 12 of the first supporting arm 1 overlap each other, respectively. Then, extend the sleeve 41 of the damping device 4 through the spiral spring 3, and position the spiral spring 3 between the overlapped first and second supporting arms 1, 2, with the locking section 411 on the sleeve 41 fitted in the retaining hole 221 on the second sidewall 22 of the second supporting arm 2, and the round butt 412 extended into the round hole 111 on the first sidewall 11 of the first supporting arm 1. Thereafter, screw a bolt 416 through a washer into the threaded hole 413 on the sleeve 41 to lock the sleeve 41 to one lateral end of the supporting arms 1, 2. Then, sequentially extend the damper 42 through the retaining hole 121 on the first supporting arm 1 and the round hole 211 on the second supporting arm 2 into the receiving space 415 in the sleeve 41, with the tenon 421 fitted in the mortise 414 to enable synchronous rotation of the pivot shaft 42 and the sleeve 41 under a predetermined resistance. Finally, sequentially extend the round column 433 of the end plug 43 through the retaining hole 121 and the round hole 211 to clamp the flat head 422 of the damper 42 in the clamping slot 436 on the end plug 43, with the locking section 432 of the end plug 43 fitted in the retaining hole 121 of the first supporting arm 1 and the base of the round column 433 fitted in the round hole 211 of the second supporting arm 2. A c-ring 435 is then engaged with the annular groove 434 at the base of the round column 433 to cooperate with the expanded stopper 431 to hold the end plug 43 to the other lateral end of the supporting arms 1, 2.

In the first embodiment of the present invention, the damping device 4 is mounted in the spiral spring 3 to reduce an overall volume of the present invention, and has two ends directly rotatably connected to the first and the second supporting arm 1, 2 to effectively simplify an overall structure of the present invention. With the damping device 4 consisting of the sleeve 41, the damper 42 and the end plug 43, the present invention could be more conveniently assembled.

In the first embodiment of the present invention, the retaining hole 121 on the first supporting arm 1, the retaining hole 221 on the second supporting arm 2, the locking section 432 on the end plug 43, and the locking section 411 on the sleeve 41 may be polygonal or oblong holes other than the square hole, or any other shape that enables synchronous movement of the damping device 4 and the supporting arms 1, 2.

Figure 4:
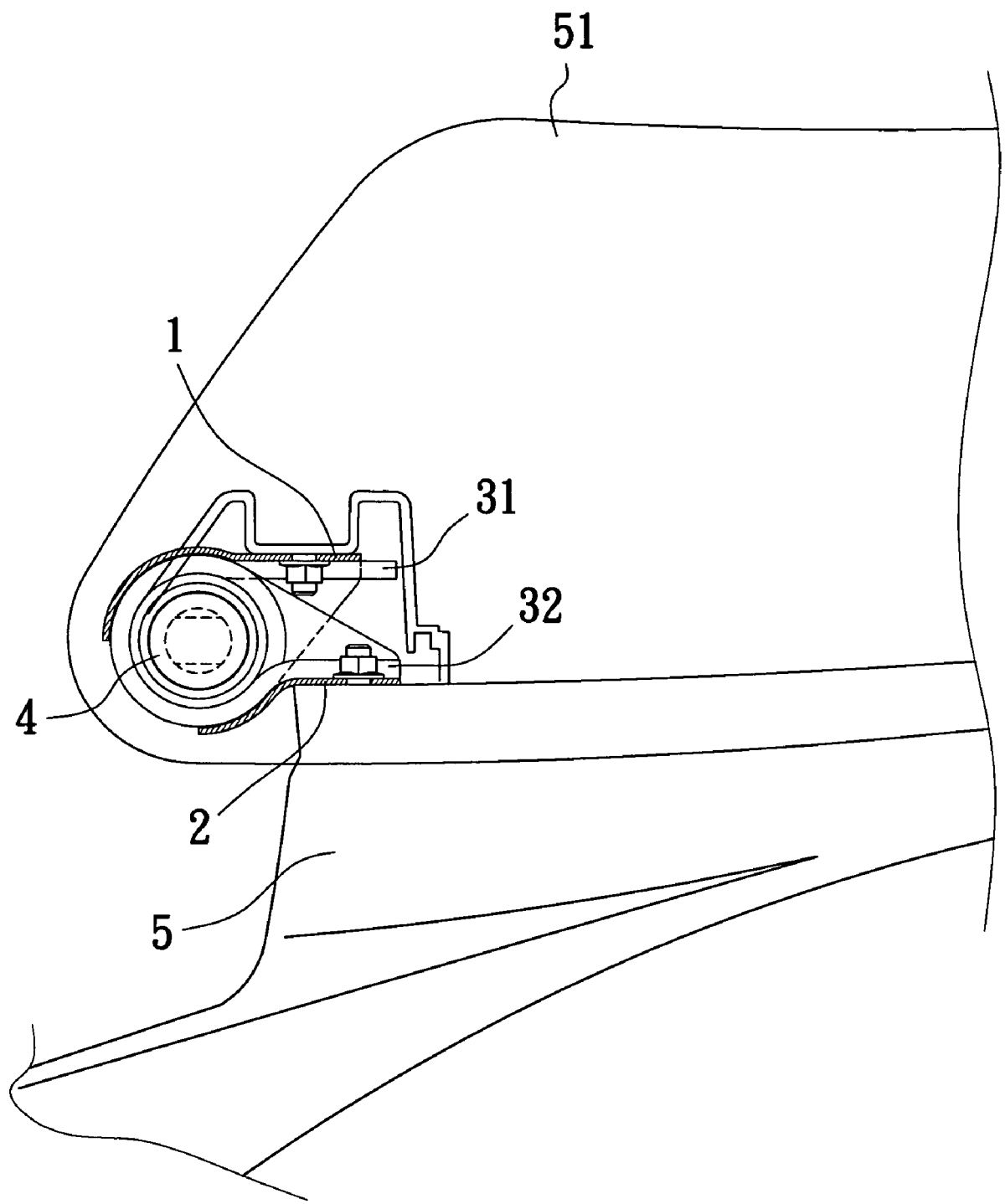
FIG. 4 shows the state of the automatic lifting mechanism according to the first embodiment of the present invention when the motorcycle saddle is in a closed position.
Figure 5:
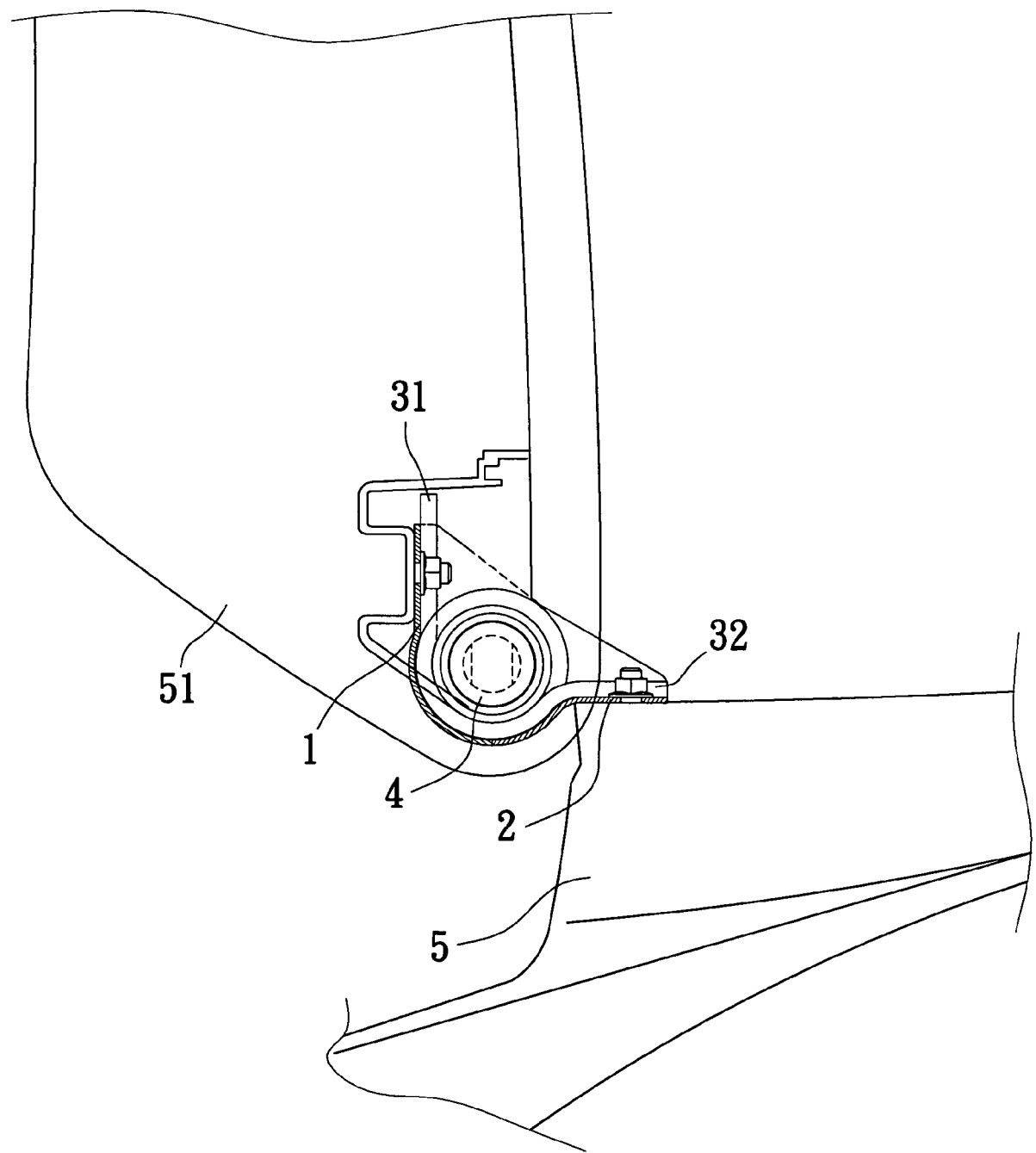
FIG. 5 shows the state of the automatic lifting mechanism according to the first embodiment of the present invention when the motorcycle saddle is in an opened position.

FIGS. 4 and 5 respectively shows the operation of the first embodiment of the present invention when a motorcycle saddle is closed and opened. As shown, in implementing the first embodiment, the first and the second supporting arm 1, 2 are connected to a saddle 51 and a front end of a body 5 of a motorcycle, respectively. When the saddle 51 is unlocked, a spring force of the spiral spring 3 is acted on the first and the second supporting arm 1, 2 via the two terminal ends 31, 32, respectively, to provide a stretching force for the saddle 51 to directly pivotally turn upward to an opened position. Since the first and the second supporting arm 1, 2 are separately connected to two ends of the damping device 4, they are limited by the damping device 4 in the course of pivotally turning upward, and the saddle 51 is allowed to spring upward or move downward at a buffered speed without the risk of injuring a user due to quick springing open or closing of the saddle 51.

Figure 6:
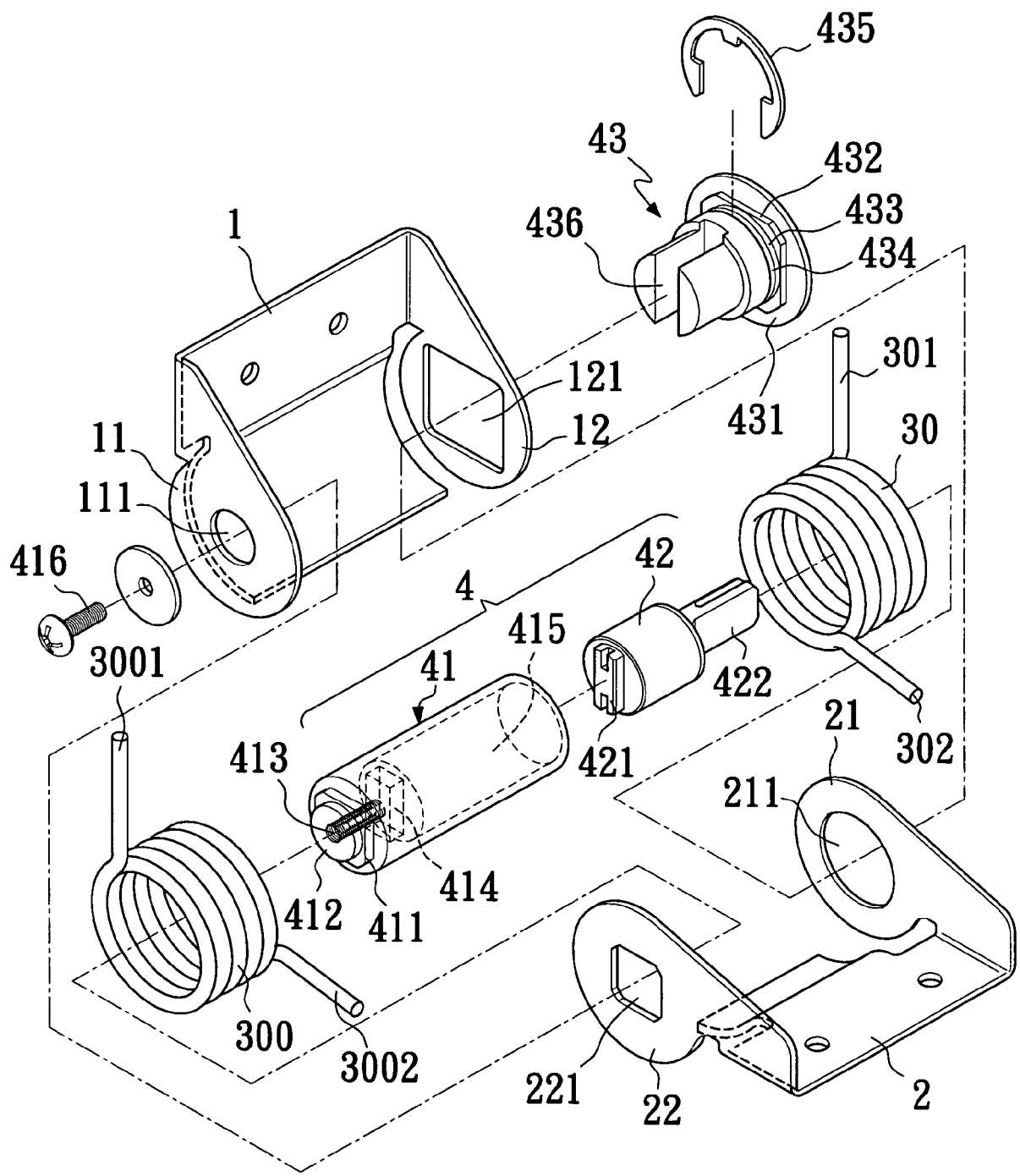
FIG. 6 is an exploded perspective view of an automatic lifting mechanism for motorcycle saddle according to a second embodiment of the present invention.
Figure 7:
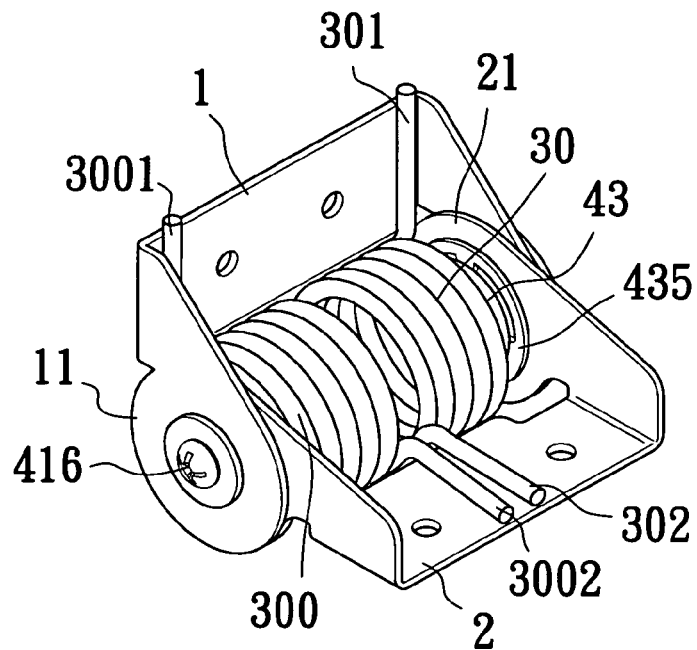
FIG. 7 is an assembled perspective view of FIG. 6.
Figure 8:
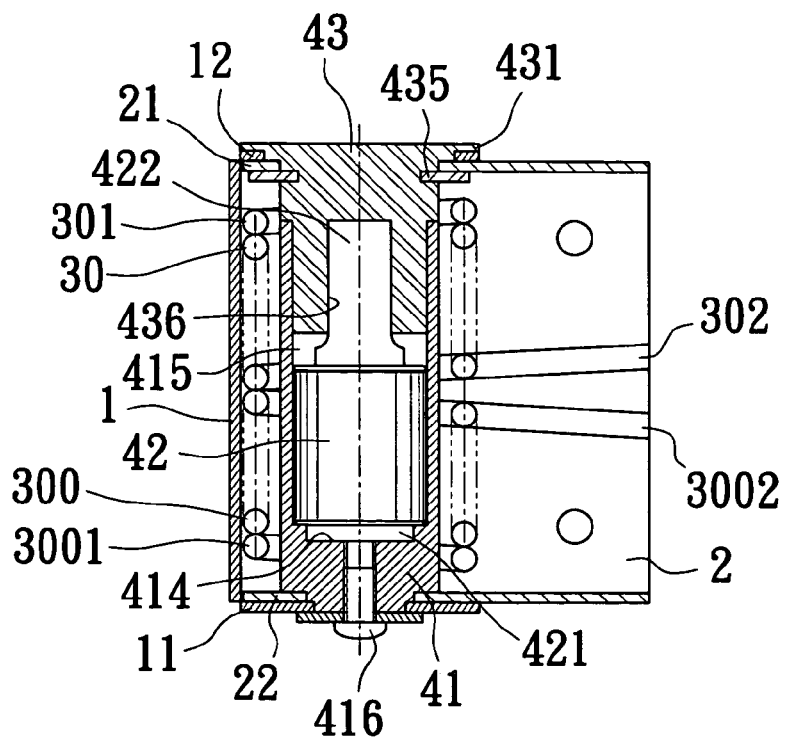
FIG. 8 is an assembled sectional view of FIG. 7.

Please refer to FIGS. 6 and 7 that are exploded and assembled perspective views, respectively, of an automatic lifting mechanism for motorcycle saddle according to a second embodiment of the present invention, and to FIG. 8 that is an assembled sectional view of the second embodiment of the present invention. As shown, in the second embodiment of the present invention, there are included two spiral springs 30, 300 mounted around a damping device 4 the same as that used in the first embodiment. The damping device 4 has two ends separately connected to a first and a second supporting arm 1, 2 the same as that used in the first embodiment, so as to rotate along with the first and the second supporting arm 1, 2. The spiral springs 30, 300 have a first terminal end 301, 3001 and a second terminal end 302, 3002. In assembling the second embodiment of the present invention, the two spiral springs 30, 300 are laterally symmetrically mounted, so that the second terminal ends 302, 3002 are located adjacent to one another to press against the second supporting arm 2, and the first terminal ends 301, 3001 are pressed against the first supporting arm 1 to provide balanced and stable support between the two supporting arms 1, 2.

Figure 9:
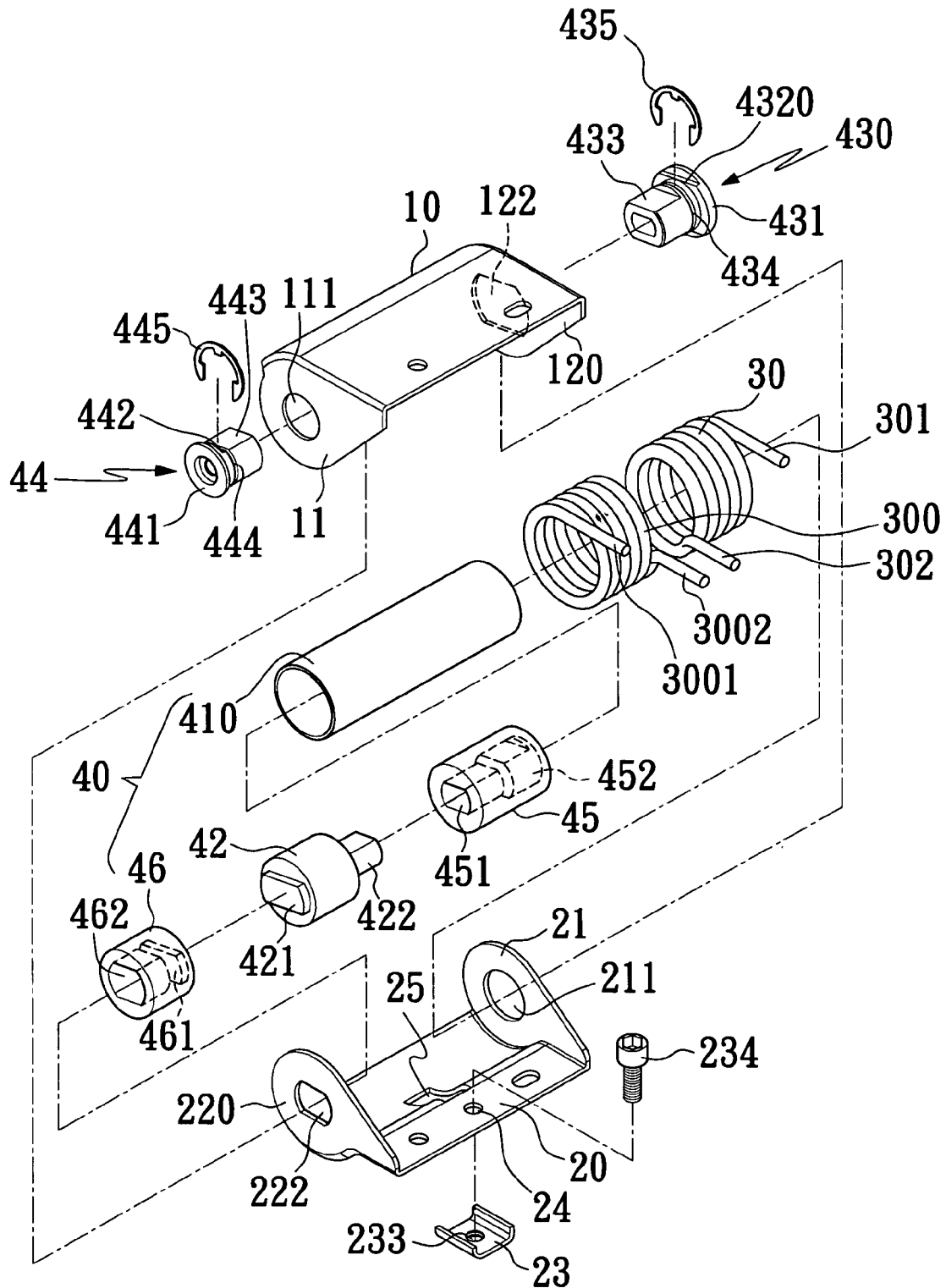
FIG. 9 is an exploded perspective view of an automatic lifting mechanism for motorcycle saddle according to a third embodiment of the present invention.
Figure 10:
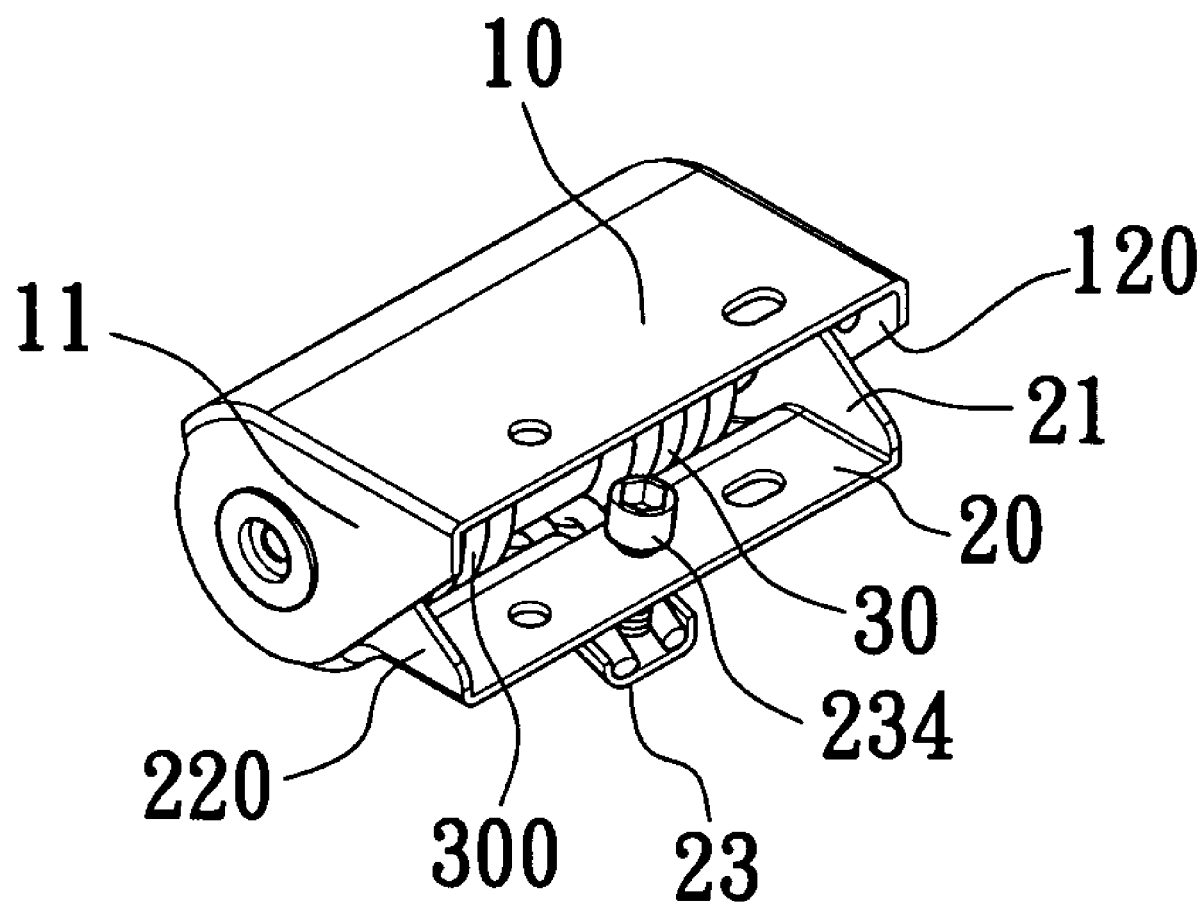
FIG. 10 is an assembled perspective view of FIG. 9.

Please refer to FIGS. 9 and 10 that exploded and assembled perspective views, respectively, of an automatic lifting mechanism for motorcycle saddle according to a third embodiment of the present invention. The third embodiment is designed based on the structure of the second embodiment with the following differences.

In the third embodiment, there are a first supporting arm 10 having two perpendicularly bent sidewalls 11, 120, and a second supporting arm 20 having two perpendicularly bent sidewalls 21, 220. The second sidewalls 120, 220 are respectively provided at a central area with an oblong retaining hole 122, 222 having straight long edges. The second supporting arm 20 is further provided at a middle section with a round hole 24 and an opening 25 axially spaced from the round hole 24 by a predetermined distance. Two second terminal ends 302, 3002 of two spiral springs 30, 300, respectively, are parallelly extended through the opening 25 to locate below the second supporting arm 20. A bolt 234 is extended through the round hole 24 on the second supporting arm 20 to engage with a threaded hole 233 on a clamping piece 23, which is located below the second supporting arm 20, so that the two second terminal ends 302, 3002 of the two spiral springs 30, 300 are clamped between the second supporting arm 20 and the clamping piece 23. When the bolt 234 is screwed into the threaded hole 233 by different depths, the clamping piece 23 is brought to press against and apply different magnitudes of clamping force on the two second terminal ends 302, 3002 of the spiral springs 30, 300. In this manner, it is possible to adjust the elastic force of the two spiral springs 30, 300.

In the third embodiment, there is provided a damping device 40 consisting of a hollow sleeve 410, a damper 42, and a first and a second interconnecting sleeve 45, 46. The interconnecting sleeves 45, 46 are mounted in the hollow sleeve 410 with the damper 42 located between them. The damper 42 is provided at two ends with axially outward projected flat head 422 and tenon 421 for fitly extending into and engaging with the first and the second inner retaining recess 451, 461, respectively, provided at inner ends of the first and second interconnecting sleeves 45, 46, so that the damper 42 and the two interconnecting sleeves 45, 46 may rotate synchronously. The first and the second interconnecting sleeve 45, 46 are provided at respective outer end with a first and a second outer retaining recess 452, 462.

In the third embodiment, there are provided a first and a second end plug 430, 44. The first end plug 430 is provided at an inner end with a first flat head 433 and at an outer end with a first expanded stopper 431. The first flat head 433 has size and cross section the same as that of the first outer retaining recess 452 for inserting into the latter. The first expanded stopper 431 is sized larger than the oblong retaining hole 122 on the second sidewall 120 of the first supporting arm 10. A first locking section 4320, which has size and cross section the same as that of the retaining hole 122, and a round butt are sequentially provided at an inner side of the first expanded stopper 431. When the first flat head 433 of the first end plug 430 is inward extended through the retaining hole 122, the first locking section 4320 and the round butt in front of it are fitly engaged with the retaining hole 122 on the second sidewall 120 of the first supporting arm 10 and the round hole 211 on the first sidewall 21 of the second supporting arm 20, respectively, and the first expanded stopper 431 is abutted on an outer side of the second sidewall 120 of the first supporting arm 10, so that the first end plug 430 and the second sidewall 120 of the first supporting arm 10 may move synchronously. A first annular groove 434 is provided between the first locking section 4320 and the first flat head 433 for a first C-ring 435 to engage therewith, so that the first C-ring 435 cooperates with the first expanded stopper 431 to clamp the sidewalls 120, 21 between them.

The second end plug 44 is provided at an inner end with a second flat head 443 and at an outer end with a second expanded stopper 441. The second flat head 443 has size and cross section the same as that of the second outer retaining recess 462 of the second interconnecting sleeve 46 for inserting into the second outer retaining recess 462. The second expanded stopper 441 is sized larger than the oblong retaining hole 222 on the second sidewall 220 of the second supporting arm 20. A second locking section 442, which has size and cross section the same as that of the retaining hole 222, is provided at an inner side of the second expanded stopper 441 with a round butt located between them. When the second flat head 443 of the second end plug 44 is inward extended through the retaining hole 222, the second locking section 442 and the round butt behind it are fitly engaged with the retaining hole 222 on the second sidewall 220 of the second supporting arm 20 and the round hole 111 on the first sidewall 11 of the first supporting arm 10, respectively, and the second expanded stopper 441 is abutted on an outer side of the first sidewall 11 of the first supporting arm 10, so that the second end plug 44 and the second sidewall 220 of the second supporting arm 20 may move synchronously. A second annular groove 444 is provided between the second locking section 442 and the second flat head 443 for a second C-ring 445 to engage therewith, so that the second C-ring 445 cooperates with the second expanded stopper 441 to clamp the sidewalls 11, 220 between them.

In the third embodiment, the provision of the clamping piece 23 enables the two spiral springs 30, 300 to form a stable and adjustable elastic supporting and connecting elements between the first and the second supporting arm 10, 20; and the provision of the hollow sleeve 410 and the two interconnecting sleeves 45, 46 of the damping device 40 enables easy and convenient assembly of the present invention.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An automatic lifting mechanism for motorcycle saddle, comprising:
   a first supporting arm connected to a saddle of a motorcycle and provided at two lateral ends with two perpendicularly bent sidewalls, a first one of said two sidewalls being provided at a central area with a round hole, and a second one of said two sidewalls being provided at a central area with a retaining hole;
   a second supporting arm connected to a body of said motorcycle and provided at two lateral ends with two perpendicularly bent sidewalls adapted to extend into an inner side of said two sidewalls of said first supporting arm; a first one of said two sidewalls of said second supporting arm being provided at a central area with a round hole to locate adjacent to said retaining hole on said first supporting arm, and a second one of said two sidewalls being provided at a central area with a retaining hole to locate adjacent to said round hole on said first supporting arm;
   at least one spiral spring positioned between said first and said second supporting arm and having a first and a second sideward extended terminal end elastically pressed against said first and said second supporting arm, respectively, so that said first and said second supporting arm could be sprung open while being pivotally connected with each other; and
   a damping device consisting of a sleeve, a damper, and at least one end plug; said sleeve being a cylindrical member adapted to mount in said spiral spring, said damper being mounted in said sleeve, and said at least one end plug being connected to at least one end of said damper, such that said damper is indirectly connected at two ends to said first and said second supporting arm;
   whereby when said saddle is unlocked, said at least one spiral spring provides a spring force to automatically pivotally turn and upward stretch said saddle open while said first and said second supporting arm are limited by said damping device in the course of pivotal turning, so that said saddle is sprung open or moved downward at a buffered speed without the risk of injuring a user due to a quick opening or closing thereof.

2. The automatic lifting mechanism for motorcycle saddle as claimed in claim 1, wherein said sleeve of said damping device has an open end and a closed end; said open end defining a receiving space therein, and said receiving space being provided at a closed inner end with a mortise having a predetermined shape; said closed end being externally provided at a central area with an axially outward projected locking section and a round butt axially outward projected from said locking section, whereby when said locking section is outward extended to fitly engaging with said retaining hole on said second supporting arm and thereby causes said sleeve and said second supporting arm to rotate synchronously, said round butt is rotatably fitted in said round hole on said first supporting arm; and said round butt being formed at a center with a threaded hole for a bolt to screw thereinto, such that said bolt cooperates with said closed first end of said sleeve to clamp said first sidewall of said first supporting arm and said second sidewall of said second supporting arm therebetween; and wherein said damper of said damping device is formed at an outer end with a flat head, and at an inner end with a tenon adapted to engage with said mortise in said receiving space of said sleeve for said damper and said sleeve to rotate synchronously; and wherein said at least one end plug of said damping device includes an expanded stopper, a locking section axially projecting from a central area of an inner side of said expanded stopper, and a round column further axially projecting from said locking section; whereby when said end plug is extended inward from an outer side of said second sidewall of said first supporting arm for said locking section to fit in said retaining hole on said first supporting arm and thereby enable said end plug and said first supporting arm to rotate synchronously, said round column is rotatably extended through said round hole on said second supporting arm; and said round column being formed near a base thereof with an annular groove, into which a C-ring is fitted to prevent said end plug from moving out of said first supporting arm, and at an extended inner portion with a clamping slot for clamping said flat head of said damper therein to enable said end plug and said damper to rotate synchronously.

3. The automatic lifting mechanism for motorcycle saddle as claimed in claim 1, wherein said sleeve of said damping device is a hollow sleeve having two open ends, said damper of said damping device is mounted in said hollow sleeve and having first and second ends connected to first and second interconnecting sleeves, respectively, and said at least one end plug is two in number;

said damper being provided at said first end with an axially outward projected flat head and at said second end with an axially outward projected tenon for respectively fitly extending into and engaging with a first and a second inner retaining recess provided at inner ends of said first and second interconnecting sleeves, so that said damper and said first and second interconnecting sleeves may rotate synchronously; and said first and said second interconnecting sleeve being provided at respective outer end with a first and a second outer retaining recess; and a first one of said two end plugs being provided at an inner end with a first flat head and at an outer end with a first expanded stopper, a first locking section having a round butt in front of it being axially provided at an inner side of said first expanded stopper, whereby when said first flat head of said first end plug is inward extended through said retaining hole on said second sidewall of said first supporting arm, said first expanded stopper is abutted on an outer side of said second sidewall of said first supporting arm, said first locking section is fitly engaged with said retaining hole on said second sidewall of said first supporting arm for said first end plug and said first supporting arm to move synchronously, and said round butt in front of said first locking section is rotatably fitted in said round hole on said first sidewall of said second supporting arm; and a first annular groove being provided between said first locking section and said first flat head for a first C-ring to engage therewith, so that said first C-ring cooperates with said first expanded stopper to clamp said second sidewall of said first supporting arm and said first sidewall of said second supporting arm between them and preventing said first end plug from separating from said two supporting arms; and a second one of said two end plugs being provided at an inner end with a second flat head and at an outer end with a second expanded stopper, a second locking section having a round butt behind it being axially provided at an inner side of said second expanded stopper, whereby when said second flat head of said second end plug is inward extended through said round hole on said first sidewall of said first supporting arm, said second expanded stopper is abutted on an outer side of said first sidewall of said first supporting arm, said round butt behind said second locking section is rotatably fitted in said round hole on said first sidewall of said first supporting arm, and said second locking section is fitly engaged with said retaining hole on said second sidewall of said second supporting arm for said second end plug and said second supporting arm to move synchronously; and a second annular groove being provided between said second locking section and said second flat head for a second C-ring to engage therewith, so that said second C-ring cooperates with said second expanded stopper to clamp said first sidewall of said first supporting arm and said second sidewall of said second supporting arm between them and prevent said second end plug from separating from said two supporting arms.

4. The automatic lifting mechanism for motorcycle saddle as claimed in claim 1, wherein said at least one spiral spring is two in number, and said damping device is mounted in said two spiral springs; said two spiral springs being laterally symmetrically mounted with said second terminal ends of said two spiral springs located adjacent to one another to press against a central area of said second supporting arm, and said first terminal ends of said two spiral springs oppositely located at inner sides of two lateral ends of said first supporting arm to provide balanced and stable support between said first and said second supporting arms.

5. The automatic lifting mechanism for motorcycle saddle as claimed in claim 2, wherein said at least one spiral spring is two in number, and said damping device is mounted in said two spiral springs; said two spiral springs being laterally symmetrically mounted with said second terminal ends of said two spiral springs located adjacent to one another to press against a central area of said second supporting arm, and said first terminal ends of said two spiral springs oppositely located at inner sides of two lateral ends of said first supporting arm to provide balanced and stable support between said first and said second supporting arms.

6. The automatic lifting mechanism for motorcycle saddle as claimed in claim 3, wherein said at least one spiral spring is two in number, and said damping device is mounted in said two spiral springs; said two spiral springs being laterally symmetrically mounted with said second terminal ends of said two spiral springs located adjacent to one another to press against a central area of said second supporting arm, and said first terminal ends of said two spiral springs oppositely located at inner sides of two lateral ends of said first supporting arm to provide balanced and stable support between said first and said second supporting arms.

7. The automatic lifting mechanism for motorcycle saddle as claimed in claim 1, wherein said second supporting arm is further provided at a middle section with a round hole, a bolt being extended through said middle round hole to extend through and engage with a clamping piece, so that said two second terminal ends of said two spiral springs are clamped between said second supporting arm and said clamping piece;

whereby when said bolt is screwed into said clamping piece by different depths, said clamping piece is brought to press against and apply different magnitudes of clamping force on said two spiral springs to adjust an elastic force of said two spiral springs.

8. The automatic lifting mechanism for motorcycle saddle as claimed in claim 2, wherein said second supporting arm is further provided at a middle section with a round hole, a bolt being extended through said middle round hole to extend through and engage with a clamping piece, so that said two second terminal ends of said two spiral springs are clamped between said second supporting arm and said clamping piece; whereby when said bolt is screwed into said clamping piece by different depths, said clamping piece is brought to press against and apply different magnitudes of clamping force on said two spiral springs to adjust an elastic force of said two spiral springs.

9. The automatic lifting mechanism for motorcycle saddle as claimed in claim 3, wherein said second supporting arm is further provided at a middle section with a round hole, a bolt being extended through said middle round hole to extend through and engage with a clamping piece, so that said two second terminal ends of said two spiral springs are clamped between said second supporting arm and said clamping piece; whereby when said bolt is screwed into said clamping piece by different depths, said clamping piece is brought to press against and apply different magnitudes of clamping force on said two spiral springs to adjust an elastic force of said two spiral springs.

10. The automatic lifting mechanism for motorcycle saddle as claimed in claim 4, wherein said second supporting arm is further provided at a middle section with a round hole and an opening axially spaced from said middle round hole by a predetermined distance; said second terminal ends of said two spiral springs being parallelly extended through said middle opening to locate below said second supporting arm; a bolt being extended through said middle round hole to extend through and engage with a clamping piece located below said second supporting arm, so that said two second terminal ends of said two spiral springs are clamped between said second supporting arm and said clamping piece; whereby when said bolt is screwed into said clamping piece by different depths, said clamping piece is brought to press against and apply different magnitudes of clamping force on said two spiral springs to adjust an elastic force of said two spiral springs.

11. The automatic lifting mechanism for motorcycle saddle as claimed in claim 5, wherein said second supporting arm is further provided at a middle section with a round hole and an opening axially spaced from said middle round hole by a predetermined distance; said second terminal ends of said two spiral springs being parallelly extended through said middle opening to locate below said second supporting arm; a bolt being extended through said middle round hole to extend through and engage with a clamping piece located below said second supporting arm, so that said two second terminal ends of said two spiral springs are clamped between said second supporting arm and said clamping piece; whereby when said bolt is screwed into said clamping piece by different depths, said clamping piece is brought to press against and apply different magnitudes of clamping force on said two spiral springs to adjust an elastic force of said two spiral springs.

12. The automatic lifting mechanism for motorcycle saddle as claimed in claim 6, wherein said second supporting arm is further provided at a middle section with a round hole and an opening axially spaced from said middle round hole by a predetermined distance; said second terminal ends of said two spiral springs being parallelly extended through said middle opening to locate below said second supporting arm; a bolt being extended through said middle round hole to extend through and engage with a clamping piece located below said second supporting arm, so that said two second terminal ends of said two spiral springs are clamped between said second supporting arm and said clamping piece; whereby when said bolt is screwed into said clamping piece by different depths, said clamping piece is brought to press against and apply different magnitudes of clamping force on said two spiral springs to adjust an elastic force of said two spiral springs.

13. The automatic lifting mechanism for motorcycle saddle as claimed in claim 1, wherein said retaining holes provided on said sidewalls of said first and said second supporting arm include at least one straight edge.

14. The automatic lifting mechanism for motorcycle saddle as claimed in claim 2, wherein said retaining holes provided on said sidewalls of said first and said second supporting arm include at least one straight edge.

15. The automatic lifting mechanism for motorcycle saddle as claimed in claim 3, wherein said retaining holes provided on said sidewalls of said first and said second supporting arm include at least one straight edge.

16. The automatic lifting mechanism for motorcycle saddle as claimed in claim 10, wherein said retaining holes provided on said sidewalls of said first and said second supporting arm include at least one straight edge.

17. The automatic lifting mechanism for motorcycle saddle as claimed in claim 11, wherein said retaining holes provided on said sidewalls of said first and said second supporting arm include at least one straight edge.

18. The automatic lifting mechanism for motorcycle saddle as claimed in claim 12, wherein said retaining holes provided on said sidewalls of said first and said second supporting arm include at least one straight edge.

19. The automatic lifting mechanism for motorcycle saddle as claimed in claim 13, wherein said retaining holes are selected from the group consisting of rectangular holes and oblong holes.

20. The automatic lifting mechanism for motorcycle saddle as claimed in claim 14, wherein said retaining holes are selected from the group consisting of rectangular holes and oblong holes.

21. The automatic lifting mechanism for motorcycle saddle as claimed in claim 15, wherein said retaining holes are selected from the group consisting of rectangular holes and oblong holes.

22. The automatic lifting mechanism for motorcycle saddle as claimed in claim 16, wherein said retaining holes are selected from the group consisting of rectangular holes and oblong holes.

23. The automatic lifting mechanism for motorcycle saddle as claimed in claim 17, wherein said retaining holes are selected from the group consisting of rectangular holes and oblong holes.

24. The automatic lifting mechanism for motorcycle saddle as claimed in claim 18, wherein said retaining holes are selected from the group consisting of rectangular holes and oblong holes.

\* \* \* \* \*